United States Patent
Deml et al.

(10) Patent No.: US 9,651,398 B2
(45) Date of Patent: May 16, 2017

(54) METHOD FOR CHECKING A TOTAL DISTANCE WHICH IS TRAVELLED BY A MOTOR VEHICLE AND IS DISPLAYED THEREIN

(71) Applicant: CONTINENTAL AUTOMOTIVE GMBH, Hannover (DE)

(72) Inventors: Ulrich Deml, Lappersdorf (DE); Ralf Lenninger, Wuerzburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/651,562

(22) PCT Filed: Nov. 28, 2013

(86) PCT No.: PCT/EP2013/074981
§ 371 (c)(1),
(2) Date: Jun. 11, 2015

(87) PCT Pub. No.: WO2014/090585
PCT Pub. Date: Jun. 19, 2014

(65) Prior Publication Data
US 2015/0330808 A1 Nov. 19, 2015

(30) Foreign Application Priority Data
Dec. 12, 2012 (DE) .......... 10 2012 222 834

(51) Int. Cl.
*G01C 22/00* (2006.01)
*G01C 22/02* (2006.01)
*G07C 5/02* (2006.01)
*G07C 5/08* (2006.01)

(52) U.S. Cl.
CPC .......... *G01C 22/02* (2013.01); *G07C 5/02* (2013.01); *G07C 5/0841* (2013.01)

(58) Field of Classification Search
USPC ........................................ 701/32.5
See application file for complete search history.

(56) References Cited

U.S. PATENT DOCUMENTS 4,559,637 A * 12/1985 Weber .................. G01C 22/02
365/228
4,889,976 A * 12/1989 Powell .................. G01C 22/00
235/1 A (Continued)

FOREIGN PATENT DOCUMENTS

| | | |
|---|---|---|
| DE | 15 74 046 A1 | 6/1971 |
| DE | 195 22 257 A1 | 1/1997 |
| DE | 10 2004 028336 A1 | 1/2006 |
| DE | 10 2006 060515 A1 | 6/2008 |
| DE | 10 2007 046 942 A1 | 4/2009 |
| DE | 10 2008 061 924 A1 | 7/2010 |
| DE | 10 2009 042 958 A1 | 8/2011 |
| EP | 1722199 A1 | 11/2006 |
| EP | 2 466 263 A1 | 6/2012 |
| JP | 2003-065804 | 3/2003 |
| JP | 2006-047002 | 2/2006 |
| WO | WO 2011 097 656 A1 | 8/2011 |

OTHER PUBLICATIONS

William Strunk Jr & EB White, Elements of Style, 4th ed (New York: Longman, 1999), p. 40.*
2012Q01107 DE Techomanipulation—Tachojustierung beim Gebrauchtwagenkauf, pp. 1-3; Jun. 6, 2012; English Translation.

*Primary Examiner* — Krishnan Ramesh
(74) *Attorney, Agent, or Firm* — Cozen O'Connor

(57) ABSTRACT

A method for checking a total distance travelled by a motor vehicle and displaying the total distance in the motor vehicle includes: detecting a change in a component of a control device of the motor vehicle, change in the component being irreversible and taking place over a time period; assigning the magnitude and/or type of the change in the component to a comparison distance, related to the time period, travelled by the motor vehicle; comparing a distance detected by an odometer of the motor vehicle during the time period with the comparison distance; and an operator of the motor vehicle retrieving a result of the comparison or the operator receiving an automatic transmission of the result of the comparison.

13 Claims, 1 Drawing Sheet

(56) References Cited

U.S. PATENT DOCUMENTS

| | | | | |
|---|---|---|---|---|
| 5,924,057 A | * | 7/1999 | Kell | G01C 22/02 |
| | | | | 377/24 |
| 6,370,454 B1 | * | 4/2002 | Moore | G06Q 10/109 |
| | | | | 340/438 |
| 6,980,923 B1 | * | 12/2005 | Manakkal | G01C 22/02 |
| | | | | 702/165 |
| 2002/0099517 A1 | * | 7/2002 | Brendon | G01B 3/12 |
| | | | | 702/165 |
| 2003/0088348 A1 | * | 5/2003 | Gustavsson | G01C 22/02 |
| | | | | 701/29.1 |
| 2004/0093146 A1 | | 5/2004 | Gustavsson et al. | |
| 2008/0294312 A1 | * | 11/2008 | O'Connor | G07C 5/085 |
| | | | | 701/32.5 |
| 2011/0077816 A1 | * | 3/2011 | Biondo | G07C 5/008 |
| | | | | 701/31.4 |
| 2011/0251805 A1 | * | 10/2011 | Plankenhorn | G01D 5/145 |
| | | | | 702/57 |
| 2012/0262283 A1 | * | 10/2012 | Biondo | G07C 5/085 |
| | | | | 340/425.5 |
| 2013/0173453 A1 | * | 7/2013 | Raines | G06Q 40/025 |
| | | | | 705/38 |

\* cited by examiner

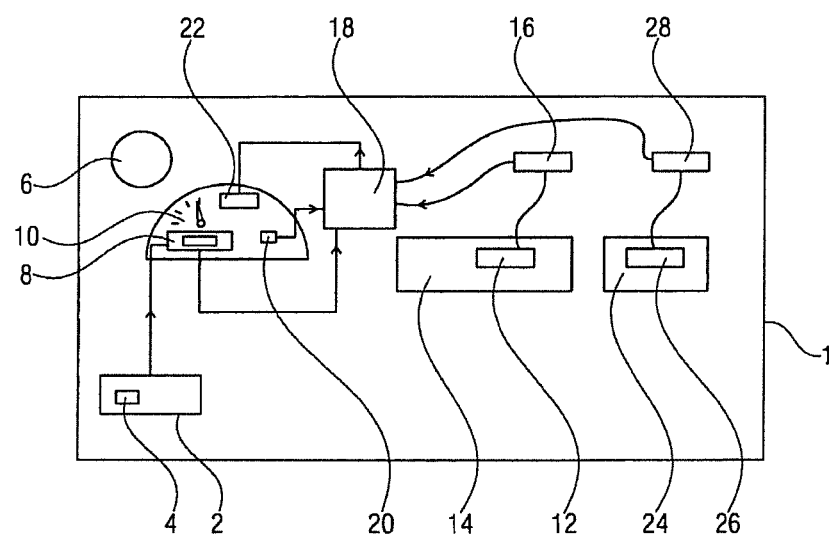

METHOD FOR CHECKING A TOTAL DISTANCE WHICH IS TRAVELLED BY A MOTOR VEHICLE AND IS DISPLAYED THEREIN

CROSS-REFERENCE TO RELATED APPLICATIONS

This is a U.S. national stage of application No. PCT/EP2013/074981, filed on 28 Nov. 2013, which claims priority to the German Application No. DE 10 2012 222 834.9 filed 12 Dec. 2012, the content of both incorporated herein by reference.

BACKGROUND OF THE INVENTION

1. Field of the Invention

The invention relates to a method for checking a total distance travelled by a motor vehicle and displayed therein, wherein a distance travelled by the motor vehicle during the operation of the motor vehicle is detected and wherein the detected distance is added to distances that have been detected as distances previously travelled by the motor vehicle to form the total distance travelled by the motor vehicle.

2. Related Art

Such a determination and display of a total distance is generally known in motor vehicles. For this purpose, a distance recorder with a distance travelled display device disposed, for example, in the area of a speed display device, is regularly provided in motor vehicles, indicating the total distance to an operator of the motor vehicle. Generally speaking, a trip distance travelled by the motor vehicle is also referred to as a distance travelled by the motor vehicle. The total of the trip distances travelled at a specific time is the total distance travelled by the motor vehicle at that time.

Since a relationship normally exists between the financial value of the motor vehicle and the total distance travelled by the motor vehicle, it is very important that the total distance travelled by the motor vehicle displayed by the distance travelled display device matches the total distance travelled by the motor vehicle. The total distance travelled by the motor vehicle displayed by the distance travelled display device is also referred to as the mileage of the motor vehicle. A higher total distance travelled normally means a lower financial value of the motor vehicle. It is known that various attempts have been made with deceitful intent on motor vehicles to manipulate the displayed total distance travelled by a motor vehicle such a way that the displayed total distance travelled is lower than the total distance actually travelled by the respective motor vehicle.

To restrict possibilities of a manipulation of a mileage status of a vehicle, a method is known from EP 1 722 199 A1 according to which a determination and recording of a distance run by a combustion engine is undertaken within an engine block. A recording of a total time of operation of the combustion engine with simultaneous engine wear determination is intended to be carried out.

SUMMARY OF THE INVENTION

An object of the invention is to provide a method which, in a simple manner, enables the provision of information indicating whether the displayed total distance matches the total distance actually travelled by the motor vehicle.

This object is achieved according to the invention in that a change in a component of a control device of the motor vehicle, which is irreversible and takes place over a time period, is detected on the component, that the magnitude and/or type of the change in the component is assigned to a comparison distance, related to the time period, travelled by the motor vehicle, that the distance detected during the time period as the distance travelled by the motor vehicle is compared with the comparison distance travelled, and that a result of the comparison can be retrieved by an operator of the motor vehicle or is transmitted automatically to the operator.

The distance travelled by the motor vehicle during the operation of the motor vehicle is, insofar as no manipulation occurs, detected continuously, i.e., without interruption during the operation of the motor vehicle, and the detected distance is, insofar as no manipulation occurs, added continuously, i.e., without interruption during the operation of the motor vehicle, to the total distance travelled by the motor vehicle. The total distance travelled is preferably displayed by a distance travelled display device in the motor vehicle. The display is preferably effected visually.

A possible manipulation of the total distance travelled obtained and displayed in this way could, for example, be carried out in such a way that the value of the total distance travelled is reduced, for example by improper electronic intervention from outside, for example via a diagnostic interface of the motor vehicle. The value for the total distance travelled, reduced in this way, would then be displayed. The displayed total distance travelled would no longer match the total distance actually travelled by the motor vehicle, since the total distance actually travelled by the motor vehicle would be greater than the displayed total distance travelled. The present invention advantageously enables the reliable detection of a manipulation of this type.

A different type of manipulation of the total distance travelled by the motor vehicle could involve manipulation of a signal serving to detect the distance travelled by the motor vehicle such that a value that is too low or, for example, temporarily no value at all, is detected for the distance travelled. This would result in a displayed total distance travelled that is too low compared with the total distance actually travelled by the motor vehicle. The present invention advantageously enables reliable detection of a manipulation of this type also.

It is particularly advantageous in the method according to an aspect of the present invention that any given control device of the motor vehicle can, in principle, be selected as the control device on which the irreversible change is detected. A control device can therefore advantageously be selected on which the detection of the irreversible change in a component can be most simply and economically implemented. This control device is advantageously not involved in the actual distance travelled detection and the total distance travelled display.

In one aspect the invention, a change in the component of the control device, taking place over a time period, is detected. A time-dependent irreversible change is thus detected, as a result of which an assignment to a comparison distance travelled is possible in a particularly simple manner, the comparison distance travelled advantageously being used for the further method steps according to the invention. The assignment to the comparison distance travelled can be carried out, for example, via a table created in a memory, which in each case contains a specific corresponding comparison distance travelled for specific times, for example empirically determined in advance for the motor vehicle type. However, it is also conceivable that, for example, a table stored in a memory is used for the assignment of the comparison distance travelled to a time period, the table being dynamically created using actual average speeds of the motor vehicle.

The performance of the comparison of the distance detected by the motor vehicle during the time period as the distance travelled with the comparison distance travelled is preferably carried out by a comparator. The comparator may preferably comprise the aforementioned memory with the table stored therein.

The control device having the component by which the irreversible change is detected may, for example, comprise the comparator. However, the comparator may also form part of a control device of the motor vehicle, the control device not having a component by which the irreversible change is detected in the method according to the invention. It is also conceivable for the comparator to be disposed outside the motor vehicle and to be connected to the motor vehicle, for example via a diagnostic interface, which may also be a mobile interface.

The comparator may then, for example, form part of a diagnostic tester in a workshop or a mobile radio device on which suitable comparator application software is installed.

The invention provides a comparative analysis of the comparison distance travelled and the distance detected as the distance travelled. If the time period for which the irreversible change in the component is detected is the age of the motor vehicle or at least the total operating period of the motor vehicle, the distance detected during the time period as the distance travelled is the total distance travelled by the motor vehicle.

The condition of this component, for example, at the time of commissioning or a starting of the motor vehicle can serve as a reference value for the detection of the irreversible change in the components. Generally speaking, the aforementioned reference value may be the condition of the component of which the irreversible change is detected at the beginning of the time period over which the irreversible change is detected.

It is particularly advantageous in the invention that the operator of the motor vehicle, who may, for example, be a driver of the motor vehicle or, for example, a potential purchaser of the motor vehicle, is informed in a very simple manner of a manipulation, since he receives the comparison results directly, and in fact on demand, for example by pressing a corresponding operating button or by a read-out of the comparison result, for example via an on-board diagnostic interface of the motor vehicle, or automatically, for example through visual and/or audible and/or haptic display in the motor vehicle, for example when the motor vehicle is started. A retrieval of the comparison result is also conceivable via a wireless communication interface of the motor vehicle, via which, for example a mobile radio device is coupled to the motor vehicle and the comparison result is then displayed on the mobile radio device.

One advantageous further development of the invention provides that, on one component in each case of at least two control devices of the motor vehicle, an irreversible change in the respective component taking place over the time period is detected, that the magnitude and/or type of the change in the respective component is assigned to a comparison distance, related to the time period, travelled by the motor vehicle and that the distance detected during the time period as the distance travelled by the motor vehicle is compared in the comparison with the at least two comparison distances travelled. With this further development, the comparison result is consequently obtained in the comparison from a comparison of the distance detected as the distance travelled with at least two comparison distances travelled. In this way, since at least two control devices, which would furthermore have to be known to the potential manipulator, would have to be involved in a manipulation, the possibility of manipulation of the displayed total distance travelled is rendered more difficult, and the reliability of the method according to the invention is additionally increased.

It is particularly simple for the operator to detect whether a manipulation occurs if, according to one advantageous further development of the invention, the comparison result is an exclusively qualitative statement according to which the distance detected during the time period as the distance travelled matches or does not match the comparison distance travelled or the comparison distances travelled. A non-match indicates a manipulation, and the operator may, for example, refer to a workshop in order to arrange for a further and, if necessary, more detailed check to be carried out. A non-match preferably occurs if the distance detected during the time period as the distance travelled deviates by more than 20%, in particular by more than 30%, from the comparison distance travelled or one of the comparison distances travelled.

Any given time period for which the irreversible change in the component of the control device is detected can essentially be selected. For a rental vehicle, for example, it could be useful to select one or more days as the time period in order to isolate a manipulation over a short period of time. However, for the sake of a particularly good clarity of the method and a simple result statement, for example in the case of a sale of the motor vehicle, it is particularly advantageous if, according to a different further development of the invention, the time period is at least the total operating period of the motor vehicle and the distance travelled by the motor vehicle detected during the time period as the distance travelled is the total distance travelled by the motor vehicle. The total operating period of the motor vehicle is the time period that comprises the total of the individual operating times of the motor vehicle. The method becomes even simpler if the time period for which the irreversible change in the component of the control device is detected is the motor vehicle age, so that it is not necessary to laboriously detect and add up individual operating times. Since a motor vehicle is not, as a rule, continuously in operation, the motor vehicle age normally comprises a substantially greater time period than the total operating period of the motor vehicle, wherein the total operating period of the motor vehicle is a subset of the motor vehicle life.

The irreversible change in the component of the control device to be detected could essentially be of any type. However, simple and reliable detectability of the irreversible change in the component of the control device can be achieved in that, according to a different further development of the invention, the irreversible change in the component of the control device comprises an age-related irreversible chemical and/or physical change in the component.

A particularly unambiguous detectability of the irreversible change in the component can advantageously be achieved if, according to a different further development of the invention, the irreversible change in the component of the control device entails an irreversible destruction of a component structure of the component disposed in an inner layer of the control device. Due to the inner layer of the component structure, on the one hand, a possible result manipulation, for example through restoration of the destroyed component structure, is rendered substantially more difficult, and, on the other hand, unintentional damage to a component structure, for example when the control device is installed in a motor vehicle, is also prevented. In particular, the aforementioned component structure may also be disposed in an inner layer of the component of the control device. The irreversible change can be detected in a simple manner, for example in a measurement of an electric voltage level of the component structure.

The method according to the invention can be designed particularly simply and economically if, according to one advantageous further development of the invention, the irreversibly destroyed component structure comprises a conductor path of a printed circuit board.

According to a different advantageous further development of the invention, the component structure has a plurality of structural elements, the structural elements in each case being irreversibly destroyed depending on a distance travelled and/or an operating time of the motor vehicle. A good temporal resolution of the check can thus be achieved in a simple manner. The aforementioned plurality of structural elements may advantageously be a plurality of conductor paths. One example embodiment could be the irreversible destruction of conductor paths in an inner layer of the control device, wherein, for example, in each case after a specific distance travelled, for example 10,000 km, a different conductor path is melted by current intake. If, for example, 30 conductor paths of this type are provided, the actual total distance travelled by the motor vehicle can be precisely estimated to within 10,000 km between 0 km and 300,000 km. The destruction of the conductor paths does not have to take place in distance travelled segments of identical size, but it is also conceivable that smaller distance travelled segments are initially used, and that the distance travelled segments after which a destruction takes place in each case subsequently become greater. In this way, a value loss reducing over time, i.e., a falling value loss curve, of the motor vehicle can be mapped by an initially higher resolution. Furthermore, the conductor paths do not have to be located in the immediate vicinity of one another, but may, for example, also be disposed at different locations of the component of which the change is detected. The component may, for example, be a printed circuit board.

It is particularly simple and economical if, according to a different advantageous further development of the invention, the irreversibly destroyed component structure comprises at least one structural element of an integrated circuit. The inner structure of the electric circuit is designed in such a way that the structural element is destroyed in a time-dependent manner or depending on the distance detected during the operation of the motor vehicle. A plurality of structural elements of this type, which are successively destroyed, are preferably provided.

According to a different advantageous further development of the invention, the irreversible change in the component of the control device entails an irreversible change in an electrical parameter, i.e., a characterizing electrical quantity, of the component.

A particularly reliable and favorable method can be achieved in that, according to one advantageous further development of the invention, the component is a capacitor, in particular an electrolytic capacitor, and the parameter is the capacitance of the capacitor and in that the change in the electrical parameter comprises a capacitance loss of the capacitor. The capacitance loss taking place over time is a measure of the age of the capacitor. The capacitance of the capacitor can be measured in a particularly simple manner in the control device having the capacitor.

Furthermore, a particularly reliable and favorable method can be achieved in that, according to a different advantageous further design of the invention, the component is a capacitor and the parameter is the equivalent series resistance, abbreviated to ESR, of the capacitor and in that the change in the electrical parameter comprises an age-dependent change in the equivalent series resistance.

According to a different advantageous further development of the invention, the irreversible change in the component detected on the component entails a structural change in a solder joint. A particular manipulation hindrance is thereby achieved. The structural change in the solder joint may, for example, consist in a change in grain boundaries in the solder joint.

BRIEF DESCRIPTION OF THE DRAWING

The possibility of a manipulation can also advantageously be rendered particularly more difficult in that, according to a different further development of the invention, the irreversible change in the component detected on the component entails an oxidation of a metal layer.

One example embodiment of the invention is shown in detail by means of the schematic drawing and is described in detail below, wherein:

the single FIGURE shows a schematic representation of a motor vehicle with control devices and a distance travelled display device.

DETAILED DESCRIPTION OF THE PRESENTLY PREFERRED EMBODIMENTS

The FIGURE shows an outline, schematic representation of a method for checking a total distance travelled by a motor vehicle 1 displayed in the motor vehicle 1.

A distance travelled by the motor vehicle 1 is detected during the operation of the motor vehicle 1 by an odometer device 2. The detected distance travelled is added continuously by a distance recorder 4 of the odometer device 2 to produce the total distance travelled by the motor vehicle. The total distance travelled by the motor vehicle 1 is displayed to an operator 6 of the motor vehicle 1 by a distance travelled display device 8, which is disposed here in the area of a speed display device 10 of the motor vehicle 1. The distance travelled display device 8 is thus a total distance travelled display device.

A change in a component 12 of a first control device 14 of the motor vehicle 1, which is irreversible and takes place over a time period, is detected on the component 12. The irreversible change in the component 12 is detected by a first sensor device 16.

In a comparator 18, the magnitude and/or type of the detected irreversible change in the component 12 of the first control device 14 is assigned to a first comparison distance travelled, related to the aforementioned time period of the detection, by the motor vehicle 1. Furthermore, the distance detected during the time period as the distance travelled by the motor vehicle 1 is compared in a comparison with the first comparison distance travelled.

A comparison result obtained from the comparison can be retrieved by the operator 6 of the motor vehicle 1. In this example embodiment, a button 20 is provided, which is pressed by the operator 6 of the motor vehicle 1 to retrieve the comparison result. In this example, the comparison result is then transmitted to the operator 6 by a visual display element 22. Alternatively, the comparison result can be transmitted automatically to the operator 6 according to one variant of this example embodiment, wherein, directly following the performance of the comparison, the comparison result is transmitted to the operator 6 by the visual display element 22 automatically, i.e., without action on the part of the operator 6 or a different person.

In the present example embodiment, the comparison result is transmitted visually to the operator 6 of the motor vehicle 1. However, according to variants of the example embodiment, the comparison result can also be transmitted audibly or haptically to the operator G.

In the FIGURE, it is evident that a further control device 24 of the motor vehicle 1 is provided in addition to the first control device 14. An irreversible change in a component 26 taking place over the aforementioned time period is detected on the component 26 of the further control device 24. The irreversible change in the component 26 of the further control device 24 is detected by a second sensor device 28. In the comparator 18, the magnitude and/or type of the detected irreversible change in the component 26 of the further control device 24 is allocated to a second comparison distance travelled of the motor vehicle 1 related to the aforementioned time period of the detection. In this variant of the example embodiment, the comparison result is then obtained from the comparison of the distance detected during the time period as the distance travelled with the first comparison distance travelled and the second comparison distance travelled.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for checking a total distance travelled by a motor vehicle and displaying the total distance in the motor vehicle, wherein a distance travelled by the motor vehicle during operation of the motor vehicle is detected and the detected distance is added, to distances which have been detected as distances previously travelled by the motor vehicle, to form the total distance travelled by the motor vehicle, the method comprising:
    detecting a change in a component (12) of a control device (14) of the motor vehicle (1), the change in the component (12) being irreversible and taking place over a time period, the irreversible change in the component of the control device entailing an irreversible destruction of a component structure of the component disposed in an inner layer of the control device;
    assigning at least one selected from the group consisting of: (a) the magnitude of the change in the component (12) and (b) the type of the change in the component (12) to a comparison distance, related to the time period, travelled by the motor vehicle (1);
    comparing a distance detected by an odometer (2) of the motor vehicle (1) during the time period with the comparison distance; and
    an operator (6) of the motor vehicle (1) retrieving a result of the comparison or the operator receiving an automatic transmission of the result of the comparison.

2. The method as claimed in claim 1, wherein at least two control devices (14, 24) are provided, each having a respective component (12, 26), the method further comprising:
    detecting, over the time period, an irreversible change in each of the at least two respective components (12, 26) taking place over the time period;
    assigning at least one selected from the group consisting of: (a) the magnitude of the change in the at least two respective components (12, 26) and (b) the type of the change in the at least two respective components (12, 26) in each case to a comparison distance, related to the time period, of the motor vehicle (1); and
    comparing the distance detected by the odometer during the time period with the at least two comparison distances.

3. The method as claimed in claim 2, wherein the irreversible change in the component of the control device comprises at least one selected from the group consisting of: (a) an age-related irreversible chemical and (b) a physical change in the component.

4. The method as claimed in claim 1, wherein the comparison result is presented in the form of an exclusively qualitative statement as to whether or not the distance detected during the time period as the distance travelled matches the comparison distance travelled.

5. The method as claimed in claim 1, wherein the time period is at least the total operating period of the motor vehicle (1) and the distance travelled by the motor vehicle (1) detected by the odometer (2) during the time period as the distance travelled is the total distance travelled by the motor vehicle (1).

6. The method as claimed in claim 1, wherein the irreversibly destroyed component structure comprises a conductor path of a printed circuit board.

7. The method as claimed in claim 1, wherein the component structure has a plurality of structural elements, said structural elements in each case being irreversibly destroyed depending on at least one selected from the group consisting of: (a) a distance travelled and (b) an operating time of the motor vehicle (1).

8. The method as claimed in claim 1, wherein the irreversibly destroyed component structure comprises at least one structural element of an integrated circuit.

9. The method as claimed in claim 1, wherein the irreversible change in the component of the control device entails an irreversible change in an electrical parameter of the component.

10. The method as claimed in claim 9, wherein the component is a capacitor and the electrical parameter is the capacitance of the capacitor, and that the change in the electrical parameter comprises a capacitance loss of the capacitor.

11. The method as claimed in claim 9, wherein the component is a capacitor and the electrical parameter is the equivalent series resistance of the capacitor, and that the change in the electrical parameter comprises an age-related change in the equivalent series resistance.

12. The method as claimed in claim 1, wherein the irreversible change in the component comprises a structural change in a solder joint.

13. The method as claimed in claim 1, wherein the irreversible change in the component comprises an oxidation of a metal layer.

* * * * *